(12) United States Patent
Yamada et al.

(10) Patent No.: US 11,236,816 B1
(45) Date of Patent: Feb. 1, 2022

(54) PLANETARY GEAR CARRIER FOR A PLANETARY GEAR DEVICE

(71) Applicant: ENPLAS CORPORATION, Kawaguchi (JP)

(72) Inventors: Kazuki Yamada, Kawaguchi (JP); Koki Hisai, Kawaguchi (JP)

(73) Assignee: ENPLAS CORPORATION, Kawaguchi (JP)

( * ) Notice: Subject to any disclaimer, the term of this patent is extended or adjusted under 35 U.S.C. 154(b) by 0 days.

(21) Appl. No.: 17/318,728

(22) Filed: May 12, 2021

(51) Int. Cl.
*F16H 57/08* (2006.01)
*F16H 1/32* (2006.01)

(52) U.S. Cl.
CPC ............. *F16H 57/082* (2013.01); *F16H 1/32* (2013.01); *F16H 2001/325* (2013.01); *F16H 2001/327* (2013.01)

(58) Field of Classification Search
CPC .... F16H 57/082; F16H 1/32; F16H 2001/325; F16H 2001/327
See application file for complete search history.

(56) References Cited

U.S. PATENT DOCUMENTS

| | | | | |
|---|---|---|---|---|
| 3,527,121 A | * | 9/1970 | Moore | F16H 57/082 475/338 |
| 4,043,021 A | * | 8/1977 | Mosbacher | F16H 57/082 29/437 |
| 7,329,203 B2 | * | 2/2008 | Radinger | F16H 57/082 29/893 |
| 7,341,539 B2 | * | 3/2008 | Huber | F16H 57/082 475/331 |
| 8,523,731 B2 | * | 9/2013 | Nonnweiler | F16H 57/037 475/331 |
| 2004/0235610 A1 | * | 11/2004 | Jang | F16H 57/082 475/331 |
| 2006/0275607 A1 | * | 12/2006 | Demir | F16H 57/082 428/408 |
| 2021/0239186 A1 | * | 8/2021 | Gong | E05F 15/611 |

FOREIGN PATENT DOCUMENTS

| | | | | | |
|---|---|---|---|---|---|
| DE | 102015213723 A1 | * | 1/2017 | ........... | F16H 57/082 |
| DE | 102015214241 A1 | * | 2/2017 | ........... | F16H 57/082 |
| DE | 102015216676 A1 | * | 3/2017 | ........... | F16H 57/082 |
| DE | 102018121865 A1 | * | 3/2020 | ........... | F16H 57/082 |
| DE | 102019113882 A1 | * | 11/2020 | ........... | F16H 57/082 |
| DE | 102019117489 A1 | * | 12/2020 | ........... | F16H 57/082 |
| EP | 1217262 A2 | * | 6/2002 | ........... | F16H 57/082 |
| JP | 2006009994 A | * | 1/2006 | ........ | F16H 57/0487 |

* cited by examiner

*Primary Examiner* — Sherry L Estremsky
(74) *Attorney, Agent, or Firm* — Sterne, Kessler, Goldstein & Fox P.L.L.C.

(57) ABSTRACT

An aspect of a carrier for a planetary gear device includes two separate endplates that fit together using a snap-fit assembly. Retention protrusions extending from one of the endplates snap-fit into corresponding recesses on the other endplate to assemble the carrier. The shape of the recess is configured to reduce or eliminate any tendency for loads to force retention protrusion to disengage from the recess, which may result in loss of structural integrity of the carrier.

11 Claims, 12 Drawing Sheets

… (US 11,236,816 B1)

PLANETARY GEAR CARRIER FOR A PLANETARY GEAR DEVICE

TECHNICAL FIELD

The present disclosure relates to a planetary gear carrier for a planetary gear device.

BACKGROUND

Planetary gear devices (also known as epicyclic gear devices) are a type of gearing system used to transform rotational motion in machines. These devices are used in many different applications because they are relatively compact and allow for multiple different gear ratio options for transforming rotational motion. Examples of applications of planetary gear devices include motor vehicles (where the term planetary gear box is often used), heavy vehicles (e.g., tractors and excavation equipment), industrial machines, housing equipment. Planetary gear devices may also be reduced in size and used in conjunction with actuators to operate many different mechanisms, including, for example, power back doors (PBD) in vehicles, parking brakes in vehicles, power windows in vehicles, electric shutters or electric blinds for installation and use in vehicles or buildings, such as homes or office buildings.

Planetary gear devices include several different gears that mesh with each other and work together to create a gear ratio that transforms input rotational motion to a desired output rotational motion. These gears are mounted on shafts that are, in turn, mounted to appropriate structural elements (e.g., the planetary gear carrier, the sun gear actuator or output shaft.) Planetary gear carriers are the structural element that supports the planetary gears. They are usually configured as a pair of disc-shaped endplates that are linked by supporting structure such that the endplates are spaced apart from each other and are both coaxially oriented and parallel to each other. The planetary gears reside inside the space between the endplates and partially extend beyond the outer diameter of the endplates to mesh with the ring gear or inner gear of the planetary gear device.

Assembling the planetary gears into this type of carrier requires placing the planetary gears into the space inside the carrier and then pressing gear shafts through shaft holes in the endplates to retain each planetary gear. This assembly process is relatively lengthy and requires precise placement of the planetary gear in relation to the shaft holes, which increase assembly time and complexity. Thus, there exists a need for a carrier assembly with reduced assembly time.

One solution to reduce assembly time and complexity is to make the carrier separable into multiple parts. Specifically, if the gear shafts are integrated into one of the endplates, then aligning the gears with the shafts is easily accomplished by simply sliding the gears onto the shafts. The endplates are joined by using a snap-fit assembly process. Retention protrusions extending from one of the endplates fit into recesses in the other endplate to secure the endplates to each other. This carrier reduces assembly time compared to the one-part carrier discussed above. However, this multi-part carrier has reduced structural integrity versus the one-part carrier because of the effects of torque loading on the snap-fit elements. In high-load situations the retention protrusion can be forced out of the recesses and the endplates may become separated from each other, which can lead to failure of the planetary gear device. This is particularly relevant for carriers made from plastic or composite materials because those carriers tend to have less structural integrity than carriers made from metal. Accordingly, there is a need for a carrier that improves assembly time while retaining sufficient structural integrity.

BRIEF SUMMARY

An aspect of the present disclosure is a carrier for a planetary gear device that includes a first endplate; a second endplate; and a planetary gear shaft extending from one of the first endplate or the second endplate, where the planetary gear shaft is configured to receive a planetary gear. The carrier further includes a recess disposed on a first surface of the first endplate, where the recess comprises a first wall and a second wall that extend from the first surface into the first endplate; and a retention protrusion extending from the second endplate, where the retention protrusion is configured to engage the recess to connect the first endplate and the second endplate. The first wall and the second wall of the recess may be formed at an angle to a radial line extending from a center of the first endplate to an intersection of the first wall and the second wall with an outer circumference of the first endplate, respectively.

BRIEF DESCRIPTION OF THE DRAWINGS/FIGURES

The accompanying drawings, which are incorporated herein and form part of the specification, illustrate aspects of the present disclosure and, together with the description, further serve to explain the principles of the disclosure and to enable a person skilled in the relevant art to make and use the disclosure.

DETAILED DESCRIPTION

The present disclosure will now be described in detail with reference to aspects thereof as illustrated in the accompanying drawings. References to "one aspect," "an aspect," "an example aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspect whether or not explicitly described.

As discussed above, single-piece carriers require extended assembly procedures that increases manufacturing time and cost. A solution to this issue is to use a multi-piece carrier that allows for quicker assembly. However, multi-piece carriers may have reduced structural integrity, which can lead to premature failure of the planetary gear device. Accordingly, a carrier with reduced assembly and improved structural integrity is needed.

An aspect of the present disclosure is a carrier for a planetary gear device that includes a first endplate; a second endplate; and a planetary gear shaft extending from the first endplate, where the planetary gear shaft is configured to receive a planetary gear. The carrier further includes a recess disposed on a first surface of the first endplate, where the recess comprises a first wall and a second wall that extend from the first surface into the first endplate; and a retention protrusion extending from the second endplate, where the retention protrusion is configured to engage the recess to connect the first endplate and the second endplate. The first wall and the second wall of the recess are formed at an angle to a radial line extending from a center of the first endplate to an intersection of the first wall and the second wall with an outer circumference of the first endplate, respectively. Advantages of this aspects include improved ease of assembly and carrier structural integrity under load.

Figure 1:
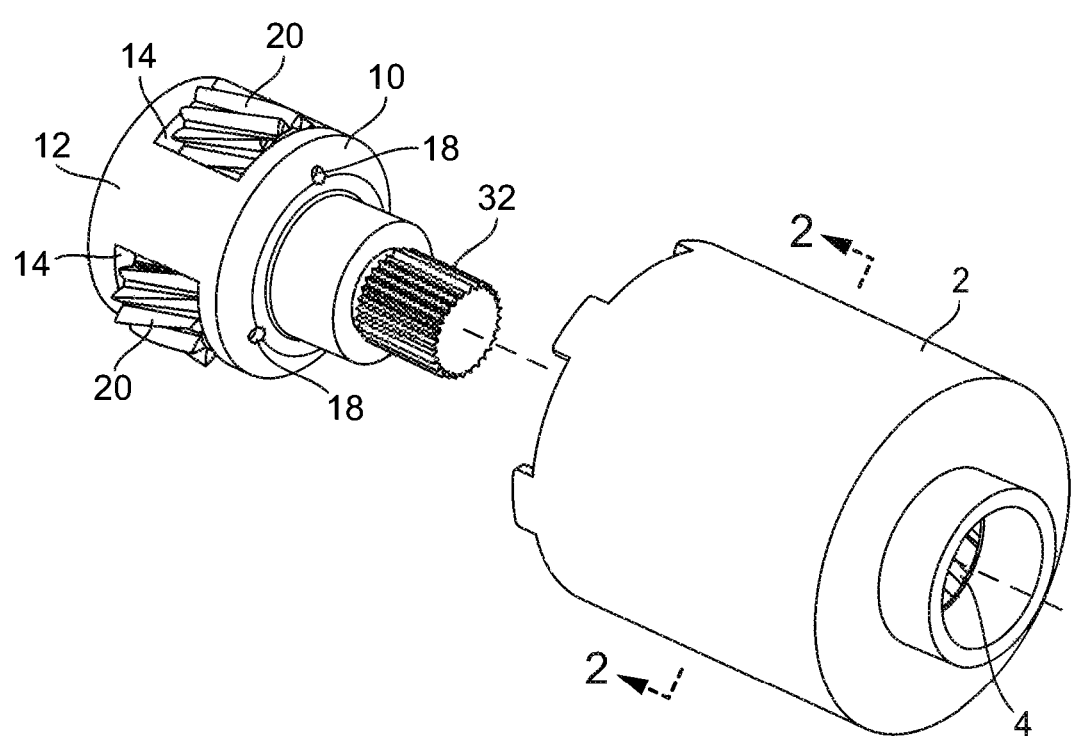
FIG. 1 is a perspective view of a planetary gear device according to aspects of the disclosure.

FIG. 1 shows a partially exploded view of a planetary gear device 1. A cylindrical housing 2 is shown along with a carrier 10 that has been removed from housing 2. Two planetary gears 20 are visible mounted in carrier 10. Each planetary gear 20 is rotatably mounted in carrier 10. There may be at least one planetary gears 20 mounted in carrier 10. In some aspects there may be two, three, four, or more planetary gears 20 rotatably mounted in carrier 10. Carrier 10 includes openings 14 in outer surface 12. Openings 14 may be designed as gaps in the circumference of outer surface 12 that correspond to the positions of planetary gears 20. Planetary gears 20, in turn, may be mounted such that teeth 23 of planetary gears 20 extend through opening 14 beyond outer surface 12 of carrier 10 in a radial direction.

Figure 2:
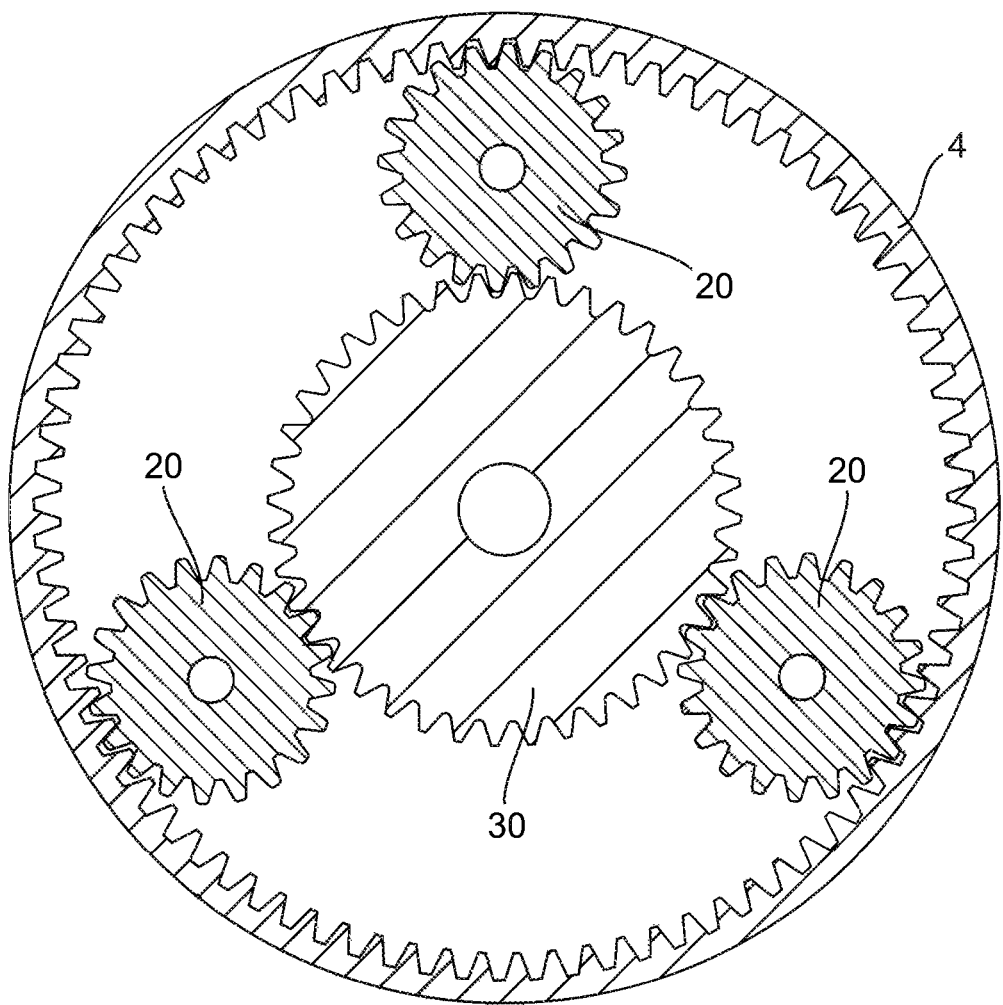
FIG. 2 is a cross section of a planetary gear device as shown in FIG. 1 according to aspects of the disclosure.

Also shown in FIG. 1 is the output shaft 32. As shown in FIG. 2 (described further below), sun gear 30 may be inserted into a sun gear opening in the center of carrier 10, according to some aspects, such that the teeth of sun gear 30 mesh with the teeth 23 of planetary gear 20. In the aspect shown in FIG. 1, output shaft 32 is embodied in one piece with a carrier 10. Output shaft 32 may have teeth that are integrally formed and configured to output the rotational motion transmitted from the sun gear 30.

As shown by the dashed axis line, carrier 10 is inserted into housing 2 such that the axis of carrier 10 and the axis of housing 2 are aligned. As shown in FIG. 3, this aspect of carrier 10 includes a boss 16 that extends from the side of carrier 10 opposite the sun gear opening. Boss 16 is received by a corresponding opening in housing 2 or other supporting structure and allows carrier 10 to rotate within housing 2.

FIG. 2 shows a cross section view of housing 2 when the planetary gear device is fully assembled. This view shows an aspect of a gear element of planetary gear device 1: internal or inner gear 4. In this aspect, internal gear 4 is fixed to the inner wall of housing 2. As shown in FIG. 2, once assembled, sun gear 30 located at the center of housing 2 is meshed with planetary gears 20, which are in turn meshed with internal gear 4.

Figure 3A:
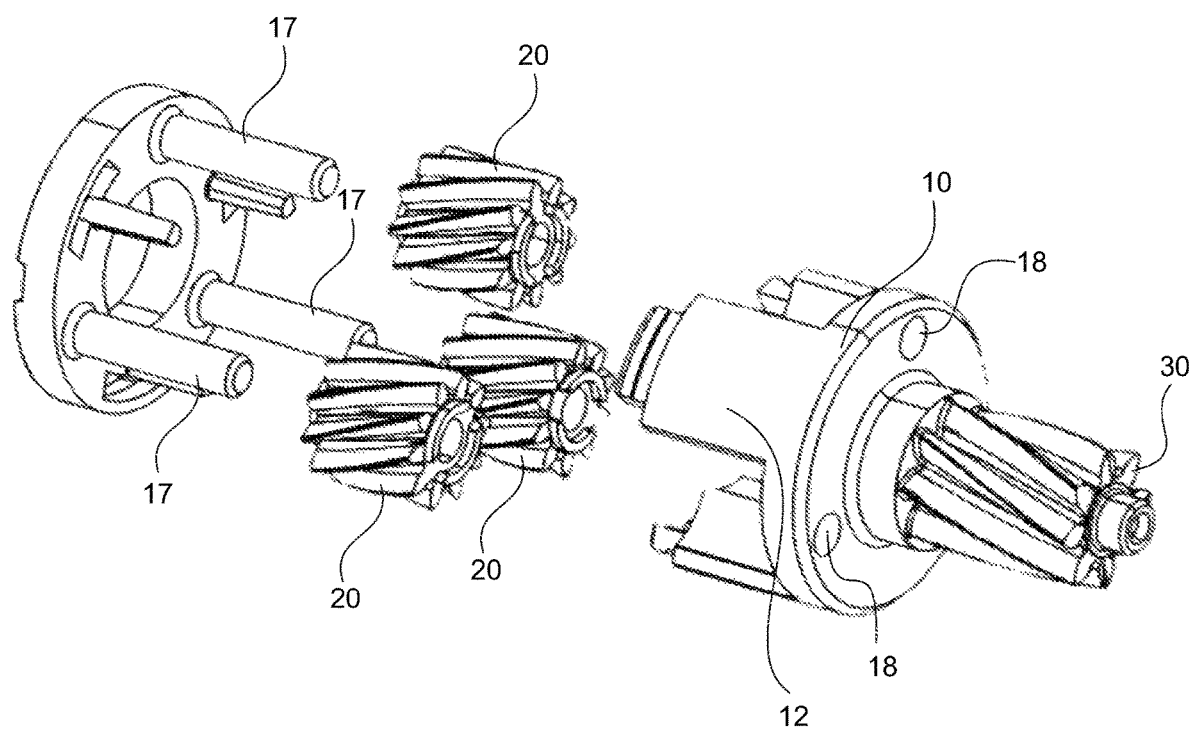
FIGS. 3A and 3B are exploded views of a carrier of a planetary gear device according to aspects of the disclosure.
Figure 3B:
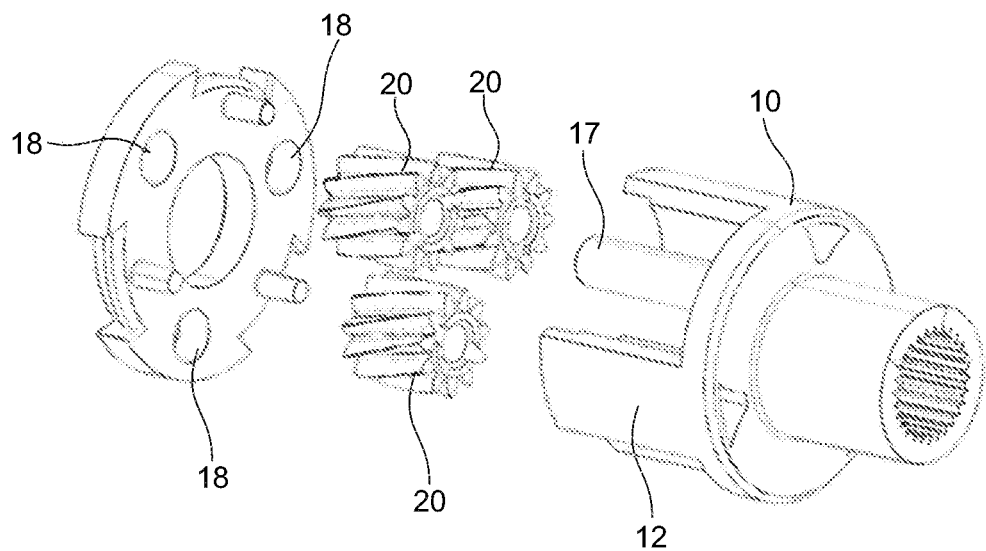
Figure 4:
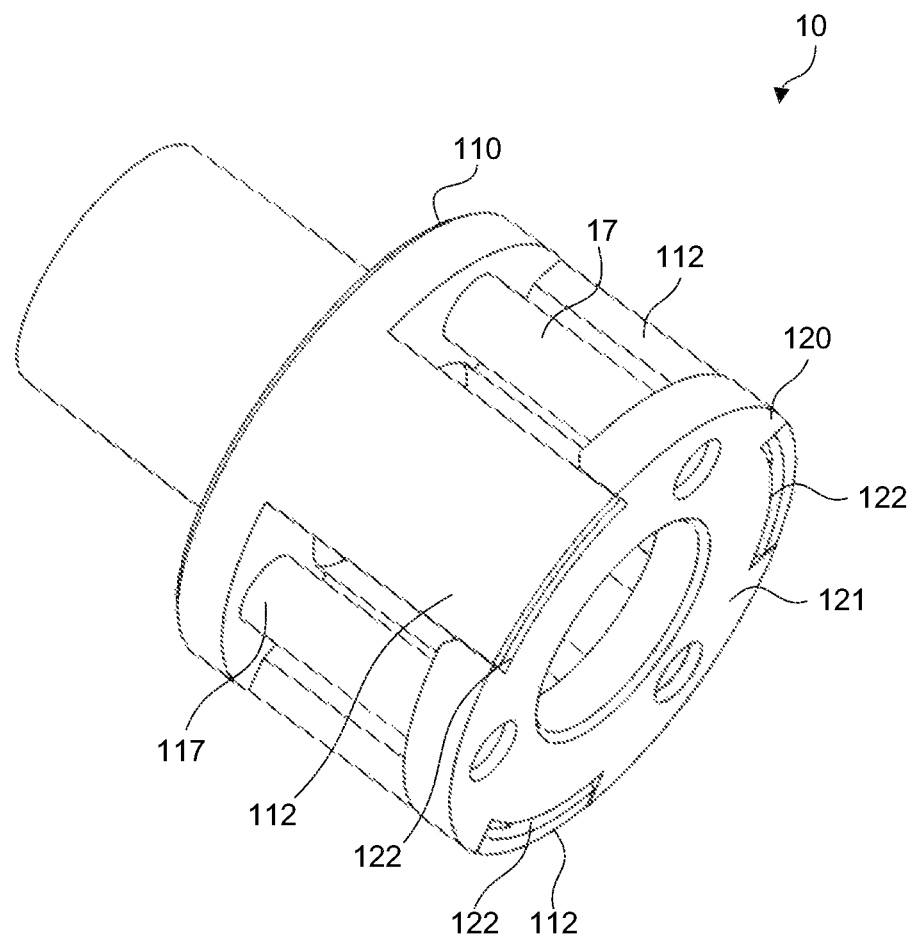
FIG. 4 is a perspective view of a carrier of a planetary gear device according to aspects of the disclosure.
Figure 5A:
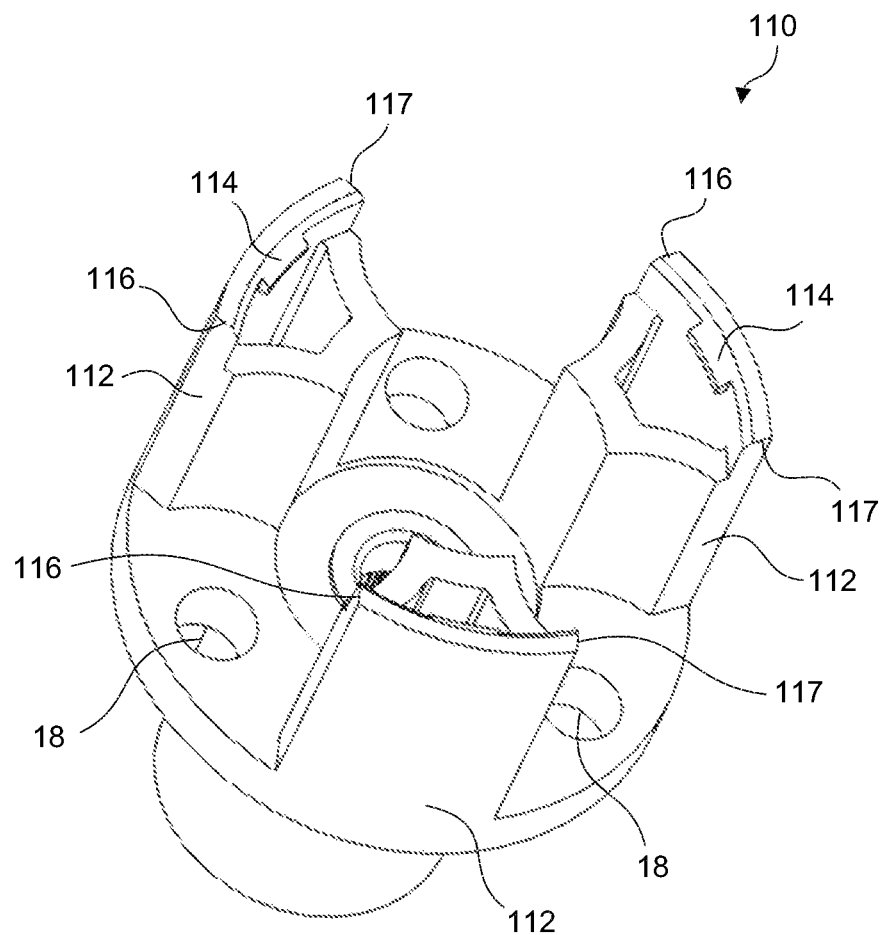
FIGS. 5A and 5B are perspective views of an endplate of a carrier of a planetary gear device according to aspects of the disclosure.
Figure 5B:
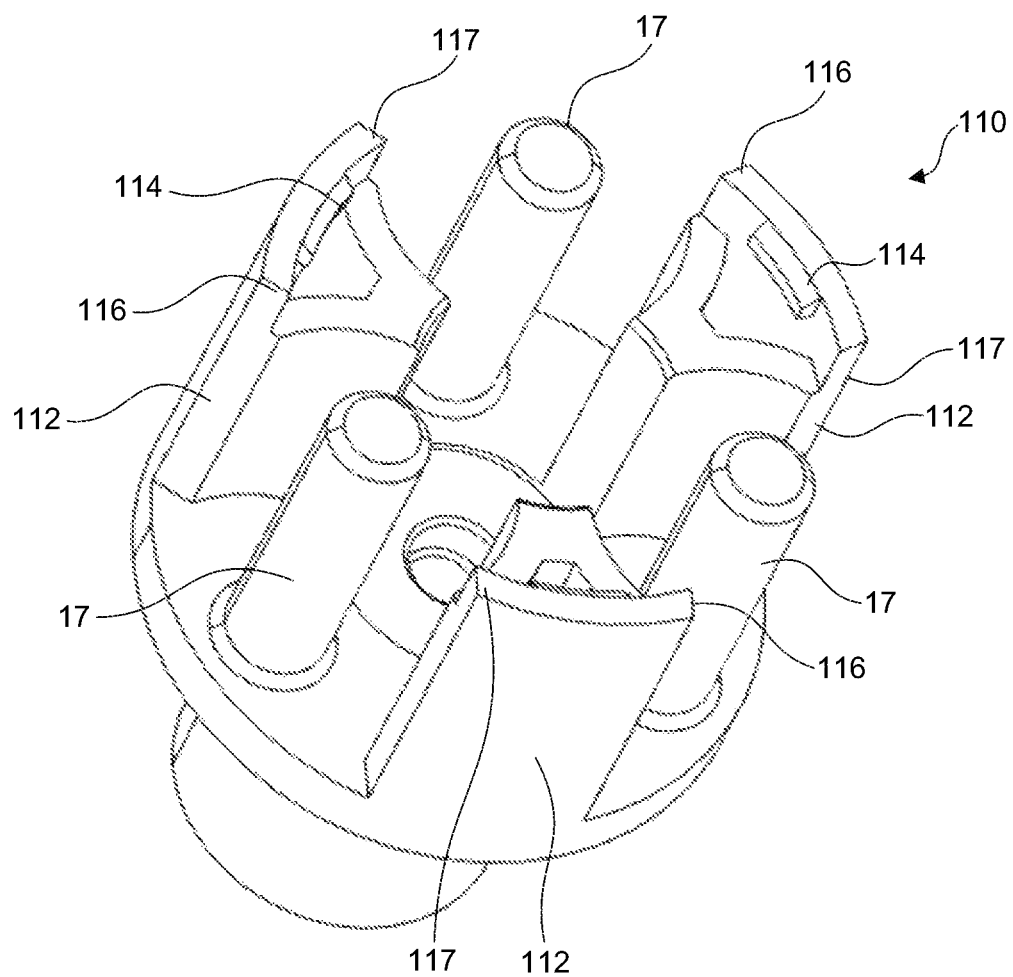
Figure 6A:
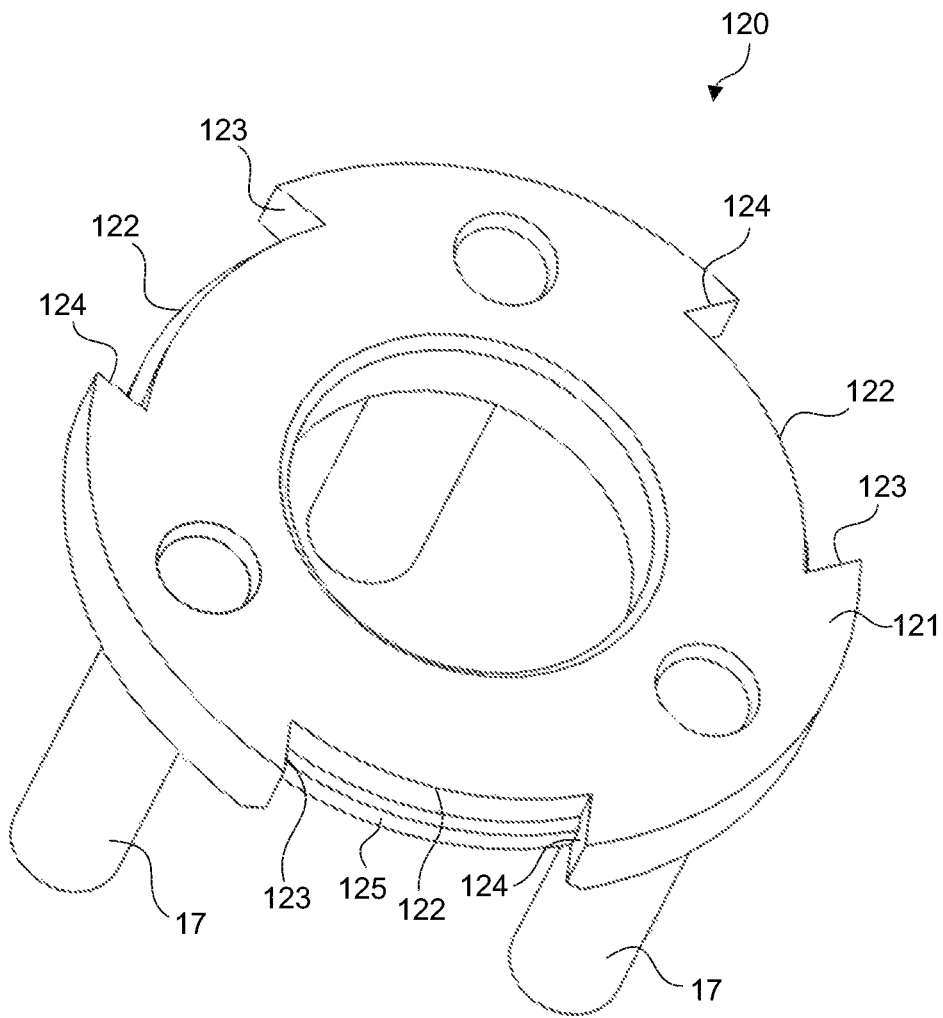
FIGS. 6A and 6B are perspective views of an endplate of a carrier of a planetary gear device according to aspects of the disclosure.
Figure 6B:
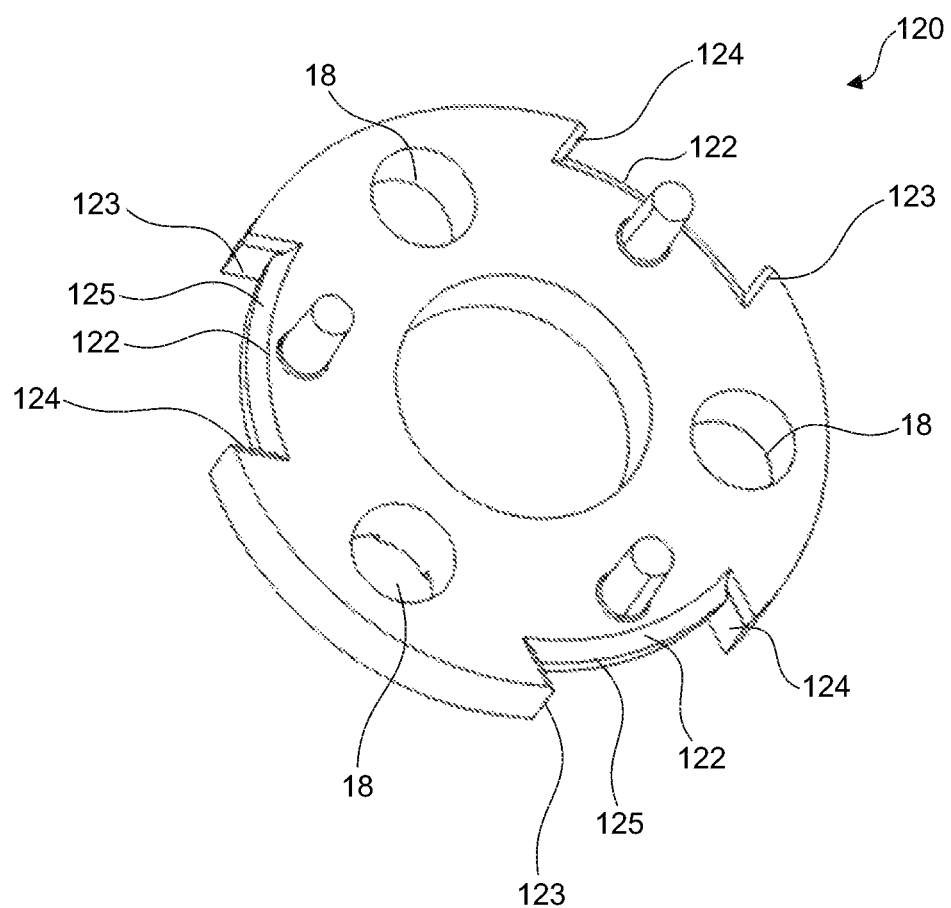
Figure 7:
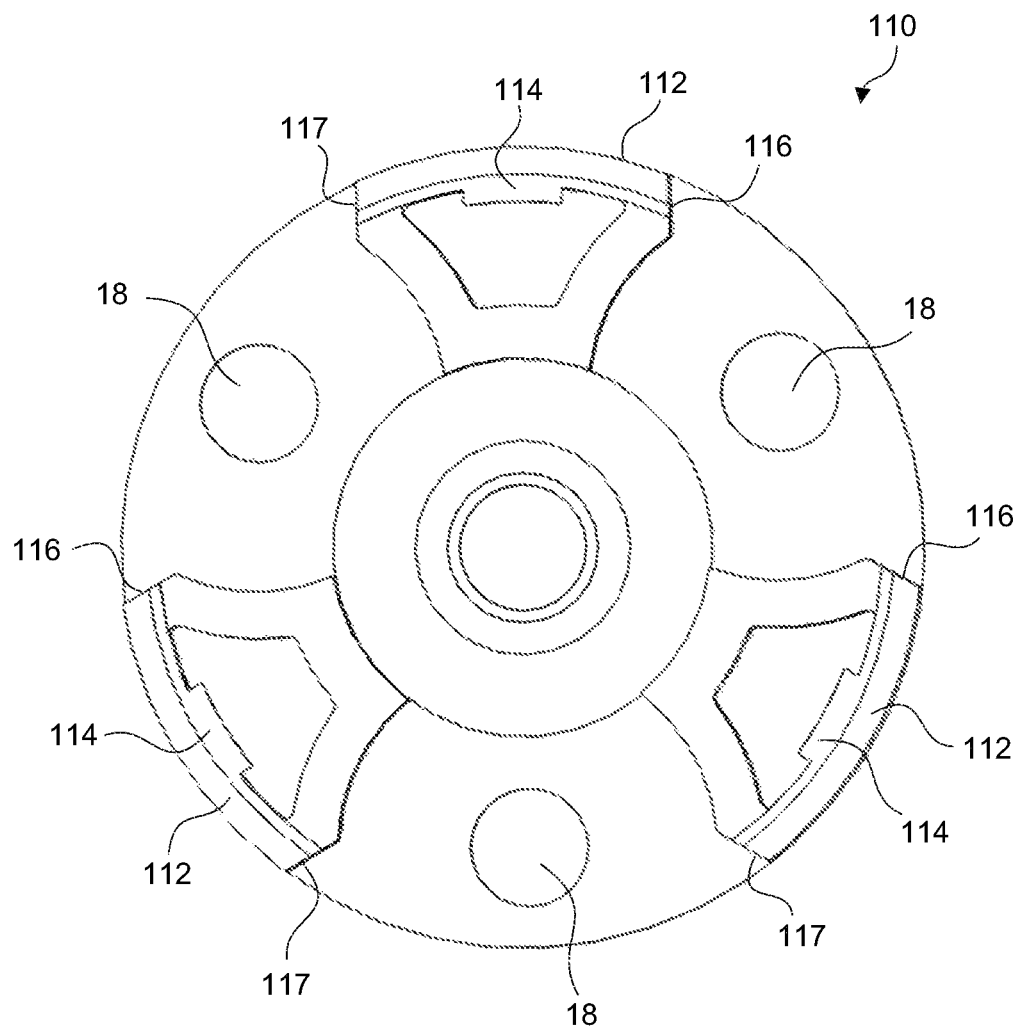
FIG. 7 is a top view of an endplate of a carrier of a planetary gear device according to aspects of the disclosure.

FIGS. 3A and 3B show aspects of carrier 10 that includes two separate portions joined together to form carrier 10: a first endplate 110 and a second endplate 120. Such an aspect of carrier 10 may improve assembly efficiency by allowing planetary gears 20 to be positioned inside first endplate 110 of carrier 10 before joining first endplate 110 with second endplate 120 together to form carrier 10. In aspects like those shown in FIGS. 3A and 3B, planetary gear shafts 17 may be integrated into a portion of carrier 10: first endplate 110 as shown in FIG. 3A, or second endplate 120 as shown in FIG. 3B, (i.e., first endplate 110), while the other portion of carrier 10 may be configured to include corresponding planetary gear shaft holes 18. Planetary gears 20 can be mounted onto planetary gear shafts 17 before joining these corresponding portions of carrier 10, according to some aspects, which may further improve assembly efficiency.

All of the elements of planetary gear device 1 discussed above may be manufactured from a suitable material. For example, elements may be manufactured from suitable metals or plastics. In some aspects, some or all of the elements discussed above may be made from synthetic resins including an ultrapolymer polyethylene (UHPE), polyphenylene sulfide (PPS), polyarylate (PAR), polyacetal (POM), or polyamide (PA), polycarbonate (PC), polybutylene terephthalate (PBT), polyether sulfone (PES), polyether ether ketone (PEEK), polyacetal (POM).

Applications of aspects of planetary gear device 1 include motor vehicles (where the terms "planetary gear box" or "planetary gearbox" may be more often used), heavy vehicles (e.g., tractors, construction, equipment, and excavation equipment), industrial machines, and household equipment, for example. Some aspects of planetary gear device 1 may also be reduced in size and weight, enabling their use in smaller applications. Compact and lightweight aspects of planetary gear device 1 may be used in conjunction with actuators to operate many different mechanisms used in vehicles, including, for example, a power back door (PBD), also known as a power lift gate, power rear hatch, or a power trunk lid; parking brakes, and power windows; and electric shutters or electric blinds for installation and use in vehicles or in buildings (e.g., homes and office buildings).

Planetary gear device 1 as shown in FIGS. 1 and 2 can function in several different ways. For example, providing a rotational input to sun gear 30 and allowing carrier 10 to rotate freely will result in a rotational output being produced housing 2, because internal gear 4 is fixed to housing 2, as shown in the accompanying drawings. The gear ratio that the rotational motion experiences is governed by the number of teeth each gear member has in planetary gear device 1. Changing which components are free to rotate and which components are the input and output alters the gear ratio and how the rotational motion is transformed by planetary gear device 1.

FIGS. 4-9 show an aspect of carrier 10 that is assembled from two main components: a first endplate 110 and a second endplate 120. FIGS. 5A-5B and 6A-6B show first endplate 110 and second endplate 120 separately, respectively. These aspects of first endplate 110 (FIGS. 5A-5B) and second endplate 120 (FIGS. 6A-6B) are similar except that in FIGS. 5A and 6A, planetary gear shafts 17 are disposed on second endplate 120, and in FIGS. 5B and 6B, planetary gear shafts 17 are disposed on first endplate 110. The discussion below regarding the assembly of first endplate 110 and second endplate 120 applies equally to either configuration of the pair of first endplate 110 and second endplate 120. First endplate 110 has one or more retention protrusions 112 extending in an axial direction. In the aspect shown in FIGS. 4 and 5, there are three retention protrusion 112 spaced evenly about an outer perimeter of first endplate 110. Each retention protrusion 112 has a retainer 114 on a distal end that extends radially inwards. Other aspects (not shown) may include at least one planetary gear shaft on each of the first endplate and the second endplate, in different relative positions, which may correspond to respective recesses on either endplate.

In the assembled carrier 10, each retention protrusion 112 are fitted into a corresponding recess 122 on second endplate 120. As shown in FIG. 6, recess is a recess extending into second endplate 120 from a surface 121 in the axial direction. Recess 122 also extends radially inwards on surface 121. A first wall 123 and a second wall 124 extend inwards and define the outer extent of recess 122 in the circumferential direction. Recess 122 may be constructed with a shelf 125 that runs the circumferential length of recess 122 and that extends radially outwards. Retainer 114 fits onto shelf 125 in recess 122 to secure second endplate plate 120 to first endplate 110. Assembly may be accomplished by flexing retention protrusion 112 radially outwards to allow retainer 114 to engage (i.e., snap over) shelf 125.

Figure 8:
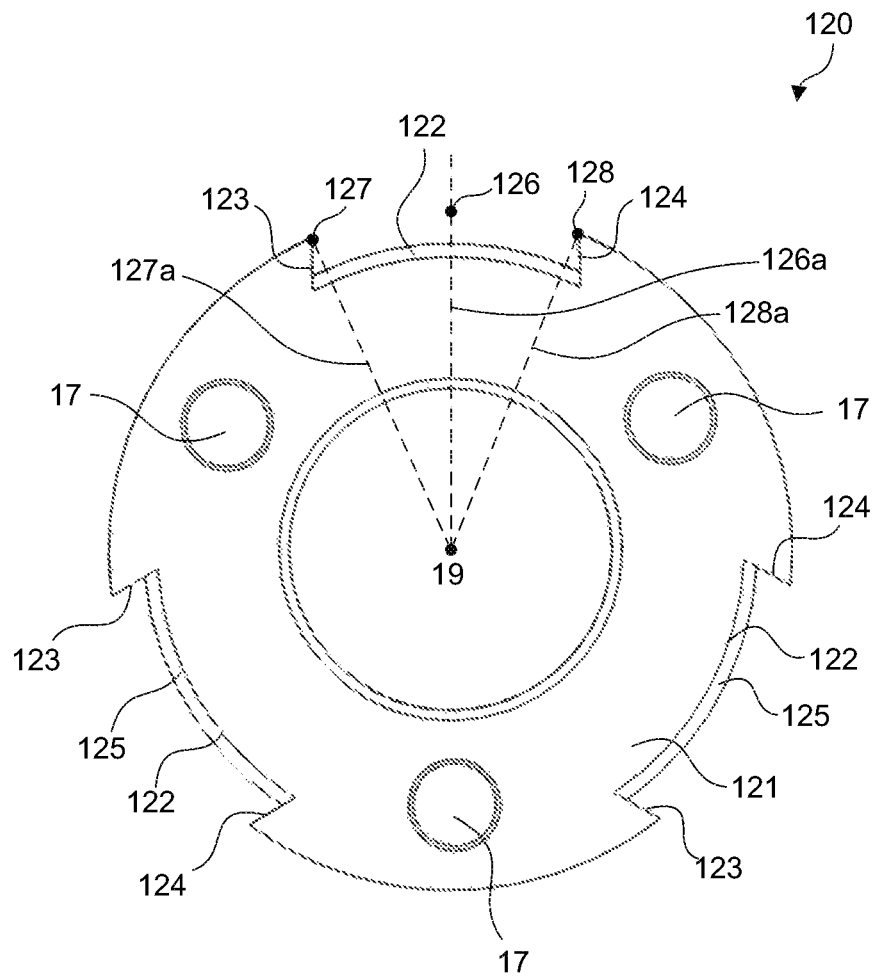
FIG. 8 is a top view of an endplate of a carrier of a planetary gear device according to aspects of the disclosure.
Figure 9:
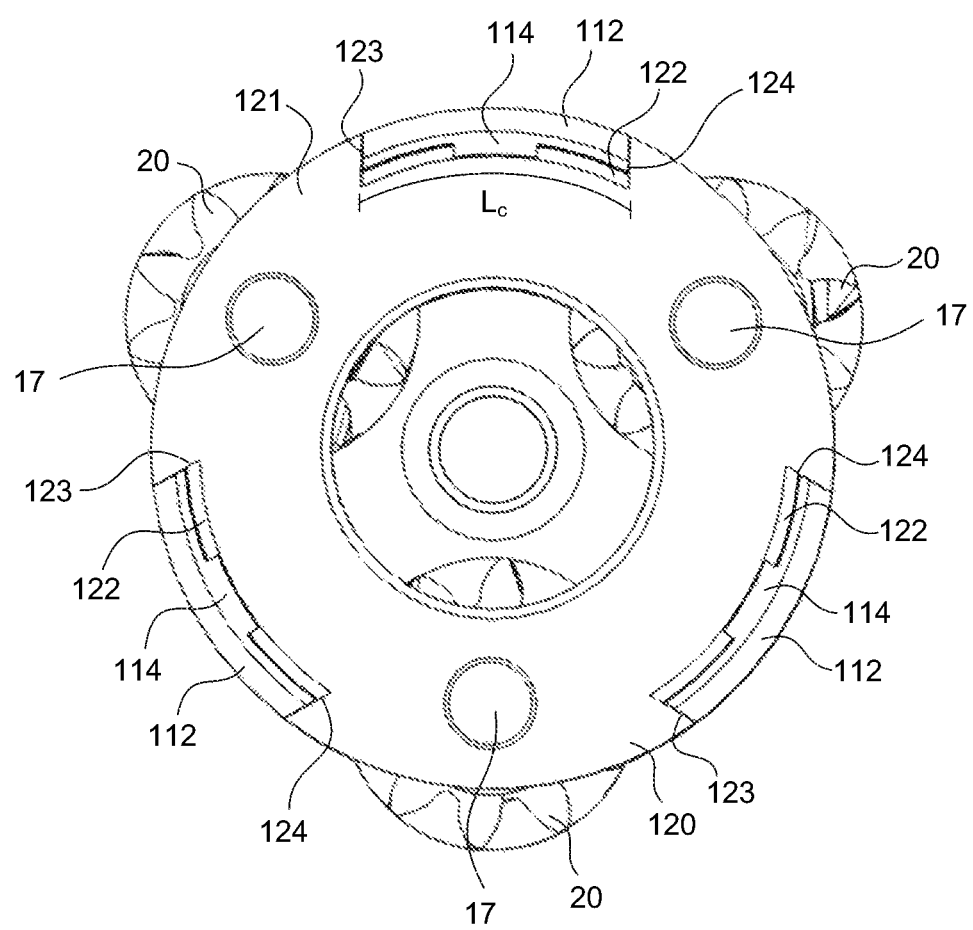
FIG. 9 is a top view of a carrier of a planetary gear device according to aspects of the disclosure.

As discussed above, some aspects of carriers 10 assembled with snap-fit retention may have reduced structural integrity when under a load. Specifically, when under a load, the torque on carrier 10 may press first wall 123 and second wall 124 towards each other (i.e., towards a center 126 of recess 122 as seen in FIG. 8.) In certain aspects of carrier 10, this has the effect of forcing retention protrusion 112 radially outwards because of the angle of first wall 123 and second wall 124. For example, in some aspects of carrier 10 first wall 123 and second wall 124 are oriented parallel to radial lines 127a and 128a (shown in FIG. 8) running from a center 19 of carrier 10 and second endplate 120 to the points 127 and 128 where first wall 123 and second wall 124 intersect with the outer circumference of second endplate 120. In these aspects, pressing first wall 123 and second wall 124 towards each other in the circumferential direction has the effect of pushing retention protrusions 114 radially outwards because of the direction of the forces exerted by first wall 123 and second wall 124 on retention protrusion 112. At least some of the force will be directed radially outwards, which causes retainer 114 to disengage with shelf 125.

In aspects as shown in FIGS. 4-9, first wall 123 and second wall 124 are oriented to reduce or eliminate a tendency of loading on carrier 10 to push retention protrusions 112 radially outwards. This may be accomplished by changing the orientation of first wall 123 and second wall 124. In some aspects of carrier 10, first wall 123 and second wall 124 are oriented to form an angle with radial lines 127a and 128a, respectively as shown in FIG. 8. In some aspects, the angles formed by first wall 123 and second wall 124 and radial lines 127a and 128a are equal (i.e., first wall 123 and second wall 124 have the same orientation with respect to radial lines 127a and 128a). In some aspects of carrier 10, first wall 123 and second wall 124 are oriented to be parallel with a radial line 126a running from center 19 of carrier 10 to center 126 of recess 122 (shown in FIG. 8). In some aspects, first wall 123 and second wall 124 are oriented to form an angle with radial line 126a running from center 19 of carrier 10 to center 126 of recess 122. In some aspects, the angle formed between first wall 123 and second wall 124 and radial line 126a is equal (i.e., first wall 123 and second wall 124 are oriented at the same respective angle to radial line 126a.) In some aspects, these angles may be such that points 128 and 127 are closer together than in the parallel-oriented aspect discussed above. In other words, in these aspects a circumferential length Lc of recess 122 reduces as radial distance from center 19 increases (i.e., recess 122 gets wider the further it extends radially into second endplate 120). These structural configurations may have an effect of reducing or eliminating any outwards-forcing tendency of recess 122 on retention protrusion 112 because the orientation of first wall 123 and second wall 124 directs the force caused by the flexing of first wall 123 and second wall tangentially or radially inwards with respect to retention protrusion 112, instead of radially outwards. As shown in FIGS. 4-9, in some aspects retention protrusion 112 may have a first wall 116 and a second wall 117 that run parallel to first wall 123 and second wall 124.

Some advantages of aspects discussed above may include increased assembly complexity, reduced assembly time, and improved structural integrity of carrier 10.

It is to be appreciated that the Detailed Description section, and not the Summary and Abstract sections, is intended to be used to interpret the claims. The Summary and Abstract sections may set forth one or more, but not all, example aspects of the present disclosure as contemplated by the inventor(s), and thus, are not intended to limit the present disclosure and the appended claims in any way.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example aspects, but should be defined only in accordance with the following claims and their equivalents.

What is claimed is:

1. A carrier for a planetary gear device, comprising:
   a first endplate;
   a second endplate;
   a planetary gear shaft extending from one of the first endplate or the second endplate, wherein the planetary gear shaft is configured to receive a planetary gear;
   a recess disposed on a first surface of the first endplate, wherein the recess comprises a first wall and a second wall that extend from the first surface into the first endplate; and
   a retention protrusion extending from the second endplate, wherein the retention protrusion is configured to engage the recess to connect the first endplate and the second endplate,
   wherein the first wall is formed at a first angle to a first radial line extending from a center of the first endplate to an intersection of the first wall with an outer circumference of the first endplate, and
   wherein the second wall is formed at a second angle to a second radial line extending from a center of the first endplate to an intersection of the second wall with an outer circumference of the first endplate.

2. The carrier of claim 1, wherein at least one of the first wall or the second wall is oriented parallel to a third radial line extending from the center of the first endplate to a center of the recess.

3. The carrier of claim 1, wherein the first angle and the second angle are the same.

4. The carrier of claim 1, wherein both the first wall and the second wall are oriented at a third angle to a third radial line extending from the center of the first endplate to a center of the recess.

5. The carrier of claim 4, wherein the first wall and the second wall are oriented such that a circumferential length of the recess decreases as a distance from the center of the second endplate increases.

6. The carrier of claim 1, wherein the recess comprises a shelf, and
wherein the retention protrusion comprises a retainer configured to engage the shelf.

7. The carrier of claim 6, wherein the retention protrusion is configured to use a snap fit to allow the retainer to engage the shelf.

8. The carrier of claim 1, further comprising a plurality of planetary gear shafts extending from the first endplate, wherein each of the planetary gear shafts is configured to receive a respective planetary gear.

9. The carrier of claim 1, further comprising a plurality of recesses disposed on the first surface of the first endplate, wherein each of the recess comprises a first wall and a second wall that extend from the first surface into the first endplate; and
a plurality of retention protrusions extending from the second endplate, wherein each of the retention protrusions is configured to engage the corresponding recess to connect the first endplate and the second endplate.

10. The carrier of claim 1, further comprising a planetary gear disposed on the planetary gear shaft.

11. A planetary gear device, comprising:
a sun gear;
the carrier of claim 1;
a planetary gear disposed on the planetary gear shaft of the carrier, wherein the sun gear is disposed in the carrier and engaged with the planetary gear; and
a housing with an inner gear disposed on an inner wall of the housing, the housing configured to support the carrier such that the planetary gear meshes with the inner gear.

* * * * *